O. A. WIBERG.
RADIAL TURBINE.
APPLICATION FILED MAY 28, 1917.
Reissued July 24, 1917.
14,333.
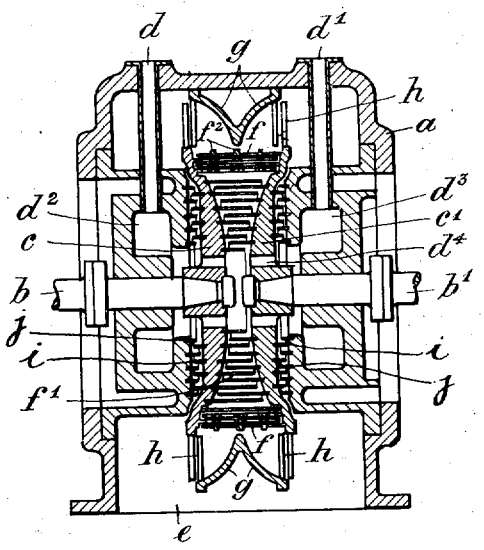
Inventor
Oscar Anton Wiberg,
By Albert G. Davis
Attorney

UNITED STATES PATENT OFFICE.

OSCAR ANTON WIBERG, OF FINSPONG, SWEDEN, ASSIGNOR, BY MESNE ASSIGNMENTS, TO AKTIEBOLAGET LJUNGSTRÖMS ANGTURBIN, OF STOCKHOLM, SWEDEN, A CORPORATION.

RADIAL TURBINE.

14,333. Specification of Reissued Letters Patent. Reissued July 24, 1917.

Original No. 1,202,135, dated October 24, 1916, Serial No. 106,220, filed June 27, 1916. Application for reissue filed May 28, 1917. Serial No. 171,443.

*To all whom it may concern:*

Be it known that I, OSCAR ANTON WIBERG, engineer, a subject of the King of Sweden, residing at Finspong, Sweden, have invented certain new and useful Improvements in Radial Turbines, of which the following is a specification.

The present invention relates to radial out-flow turbines wherein two rotors arranged to rotate in opposite directions in the same casing are provided, each rotor having concentric rings of blades, those on one rotor extending between the rings of blades on the other rotor. Such a turbine, as is well known, is a very efficient machine, but its output for the speeds commonly employed is limited by the axial lengths of the low pressure blade rings that can be employed due to the high centrifugal forces to which they are subjected.

I have invented or discovered an arrangement of parts whereby this limitation as to output is overcome and at the same time the high economy of the type preserved.

In carrying out my invention the oppositely rotating disks are provided with concentric rings of blades as before but instead of expanding the steam or other elastic fluid down to exhaust pressure therein as before it is only partially expanded and hence the volume of motive fluid to be handled is materially less and therefore the blade lengths or rings can be well within the limits of strength prescribed by good engineering practice. The motive fluid in its partially expanded state is then caused to change its direction of movement from radial to axial, and flow through a blade system having blades that are radial to the turbine axis, certain of which are stationary and the others rotatable. Since such a system is free from the mechanical difficulties incident to the radial flow blade system and since the rotor can be made of greater diameter and the blades of greater length, it follows that the necessary cross-sectional area for the working passage of the motive fluid can be more easily obtained. As the diameter can be increased it also follows that the blade speed can be increased to such a value as to efficiently extract the energy from the fluid. Having two rotors each with its own shaft and a radial flow blade system, the axial flow system can advantageously be divided into two parts and the rotating parts so formed associated one with each of the parts of said radial flow system, the stationary guiding blades or directing devices being supported by the turbine casing. These last-named blades may consist of one guide blade series or ring and one moving blade series, but the number of such series or rings may also be greater. By dividing the volume of low pressure fluid and causing it to flow in the manner stated the output for a given blade length can be doubled. It will also be seen that the blade lengths of the axial flow system need only be one-half that required for single flow and hence the diameter of the rotors and of the machine as a whole can be correspondingly reduced and this without impairing the efficiency.

I find it desirable to divide the blade rings of the radial flow system into at least two sections which for convenience may be termed high and intermediate pressure sections. The blade rings of the high pressure section being relatively short and of moderate diameter do not ordinarily require special supporting arrangements but in the intermediate pressure section as the blade rings are of larger diameter and considerably longer to handle the increased volume of motive fluid they must be provided. To this end the blades of each ring are divided into relatively short lengths between which are strengthening rings or members that are united to the blades on opposite sides. As these members must necessarily be located in the path of the flowing motive fluid sufficient space should be provided between the last ring of high pressure blades and the first ring of intermediate pressure blades to facilitate the entrance of the motive fluid to the latter without causing undue eddy currents, throttling and the losses occasioned thereby.

An embodiment of the invention is illustrated on the accompanying drawing, which represents a central vertical section of the same, the shafts being shown in side elevation.

$d$, $d^1$ indicate the inlets which supply steam to the chests $d^2$ and $d^3$ from which it flows through passages $d^4$ in the disks to the inner blades of the radial flow system. $e$ indicates the conduit which received the exhaust from the blade systems. $f^1$ indicates the high pressure blade rings that are attached to the disks $c$ and $c^1$. Surrounding these blade rings and suitably spaced therefrom are intermediate pressure blade rings $f$, the blades of which are divided into relatively short lengths with strengthening rings $f^2$ uniting said lengths and occupying planes perpendicular to the turbine axis. Outside the extreme blade rings of the radial system converging, inclined and preferably curved plates, walls or the like $g$ are arranged, constituting an annular deflector approximately V-shaped in cross section, which will divide the steam from the axial series of plates and change the direction of movement of the steam in the two currents thus formed from radial to axial. The steam in flowing radially outward strikes the curved deflectors $g$ and in so doing is compressed to a greater or less extent, the compression of course being greatest at the wall of the deflectors and progressively decreasing toward the inner ends of the stationary guide blades. As a result of this arrangement the blade action is substantially improved owing to the fact that the velocity of the steam due to said compression pressure will be greatest at the outer ends of the rotor blades where the peripheral speed is highest and progressively decrease toward their roots, where the peripheral speed is less. In other words a compensation is effected for the variation in speed of the blades along their length. Before the steam is admitted into the space inclosed by the turbine casing and in connection with the outlet, it is forced to pass a radial blade system $h$, consisting in the embodiment shown only of one guide blade ring and one moving blade ring, although the number of rings of course may be greater. The said deflector $g$ is located in the space between the two series of radially arranged blade rings $h$; it is also arranged opposite the middle of the space between the two turbine disks and annularly outside of the same and of the series of axial blades. By means of this construction it is possible to attain a very complete use of the steam in the extreme blade rings, which in radial turbines with only axially directed moving blades and guide blades causes trouble on account of the great length of the extreme blades and the heavy centrifugal strains simultaneously arising. By placing the blades in the extreme ring or rings radially, as shown in the drawing, it is possible to make these blades of the necessary length without difficulties.

The invention, that is adapted to be applied to radial doubly rotating turbines, is of a special importance in such turbines, because it is possible in the same to divide the steam from the blades in the extreme ring of the axial system into two currents and to allow each current to act on a separate system $h$. By means of this arrangement each moving blade and guide blade in these systems $h$ may be made of only half the length as in a turbine running in only one direction.

As shown in the drawing, the guide blade ring in the system $h$ is fixed, but the moving blade ring movable. It is not necessary for the radial blades $h$ to be applied to more than one of the disks.

On the outer sides of the disks are mounted concentric rings $i$ between which are other concentric rings $j$ the whole forming labyrinth packings to prevent the free escape of high pressure steam from the supply chambers connected to the inlet conduits $d^1$. As there will be a fall of pressure in these labyrinths corresponding to the fall of pressure in the radial flow blade system it follows that the disks $c$ and $c^1$ will be balanced as regards axial thrust.

What I claim is:

1. Two turbine shafts and a pair of turbine disks mounted thereon for turning in proximity to each other in opposite directions, in combination with axially extending blades on the faces of these disks and radially arranged blades, some of which are carried by said disks, the remainder being fixed guide blades, the said rotary radial blades being arranged to be acted on by the steam after it leaves the axial system of blades.

2. Two turbine shafts and a pair of turbine disks mounted thereon and turning in proximity to each other in opposite directions, in combination with axially arranged series of blades on the faces of said disks, radially arranged series of blades at the peripheries of said disks consisting of blades rotating with the latter and fixed proximate guide blades, and deflecting means external to the space between the two disks, said means being arranged to divide the steam discharged from the axial blades and direct it in two currents to the two radial series of blades respectively.

3. Two turbine shafts and their disks rotating in opposite directions in proximity to each other, in combination with series of axially extending blades on the faces of said disks, a pair of radially extending blades, one of which is carried on the periphery of each of said disks, a pair of fixed guide blades, one of which is arranged in proximity to each of these radially extending blades, and a deflector arranged in the space between the two radially extending blades, for dividing the outward current of steam and directing it in two currents to said radially extending blades.

4. In a turbine, the combination of oppositely rotating elements having a radial flow blade system, separate shafts carrying such elements, an axial flow blade system associated with each shaft and connected thereto, conduit means for conveying elastic fluid to the radial flow blade system and for conveying the exhaust therefrom to both of said axial flow blade systems, and conduit means receiving the exhaust from said axial flow blade systems.

5. In a turbine, the combination of high pressure elements having concentric rings of axially extending blades arranged to drive them in opposite directions, a separate shaft for each element, low pressure elements mechanically connected to and driving said shafts, each of said latter elements having radially extending blades, means receiving fluid exhausting from the axially extending blade rings and delivering it to the radial blades in a manner to assist the axial blades in driving the shafts, and conduit means for conveying elastic fluid to the axial blades and the exhaust from the radial blades.

6. In a turbine, the combination of an inner radial flow blade system comprising rings of axially extending blades, oppositely rotating elements on which said blade rings are mounted, shafts for said elements, an intermediate radial flow blade system comprising axially extending rings of blades divided into lengths with strengthening rings between said lengths, an outer axial flow blade system in which the blades are radially disposed which assists the other blade systems in driving said shafts, and means for delivering the fluid exhausting from the intermediate blade system to the axial flow system.

7. In a turbine, the combination of casing means, rotors mounted therein, a radial flow blade system comprising rings of blades alternately attached to said rotors to rotate them in opposite directions, and an axial flow blade system comprising stationary blades supported by the casing means, and radial blades attached to the rotors.

8. In a turbine, the combination of a casing means, independent rotors mounted therein, an inner radial flow blade system comprising rings of blades alternately attached to said rotors to rotate them in opposite directions, and an axial flow blade system receiving fluid from the radial flow system and comprising two sets of stationary blades carried by the casing means and two sets of radial blades, one set being attached to each of the rotors.

9. A radial turbine comprising two rotors with a system of axial blade rings between them which are alternately attached thereto and through which blade rings the fluid flows radially outward, and two axial flow blade systems having parts that are also attached to the rotors, said radial and axial flow systems coöperating to drive the rotors in opposite directions.

10. A radial turbine comprising two independent rotors with a system of radial flow blade rings between, said rings being alternately attached to the rotors to produce rotation in opposite directions, two sets of axial flow blades, one for each rotor, sets of stationary guide blades for said axial flow blades, and a supporting member that is common to both sets of stationary blades.

11. A radial turbine comprising two rotors with a system of radial flow blade rings between, said rings being alternately attached to the rotors to produce rotation in opposite directions, a shaft for each rotor, two axial flow blade systems, one for each rotor, which include sets of stationary guide blades, and a deflector means having outwardly curved walls which divides the motive fluid issuing from the radial flow blade rings and directs it into said sets of stationary guide blades.

12. A radial flow turbine comprising a casing, two rotors located therein having a system of radial flow blade rings between, means for admitting motive fluid to said system in their central region, packing devices which retard the escape of fluid from said region and also act to balance end thrust of said rotors, axial flow blades which are divided between said rotors to assist the radial flow system in driving the rotors in opposite directions, and stationary devices for directing the motive fluid exhausting from the radial flow system through the axial flow blades.

In witness whereof I have hereunto put my hand and seal this seventh day of March, 1917.

OSCAR ANTON WIBERG. [L. S.]

Witnesses:

TURA ALMISSING,

ENOK STUNE.